No. 805,173. PATENTED NOV. 21, 1905.
T. V. WALLACE.
HOOK.
APPLICATION FILED JAN. 18, 1905.

Witnesses:
Chas. A. Ehrenfeldt Jr.
K. H. Butler

Inventor:
Thomas V. Wallace,
By N. C. Evert & Co.
Attorneys.

UNITED STATES PATENT OFFICE.

THOMAS V. WALLACE, OF MONONGAHELA, PENNSYLVANIA.

HOOK.

No. 805,173.  Specification of Letters Patent.  Patented Nov. 21, 1905.

Application filed January 18, 1905. Serial No. 241,535.

*To all whom it may concern:*

Be it known that I, THOMAS V. WALLACE, a citizen of the United States of America, residing at Monongahela, in the county of Washington and State of Pennsylvania, have invented certain new and useful Improvements in Hooks, of which the following is a specification, reference being had therein to the accompanying drawings.

This invention relates to certain new and useful improvements in hooks, and more particularly to that type commonly known as "snap-hooks."

This invention has for its object to provide a novel form of hook wherein means is embodied for preventing a link or the like article from becoming detached from the hook after it has been secured thereon.

Another object of this invention is to provide a hook having a novel form of snap or locking device which will be extremely simple to manipulate and will be protected from being struck by any object, whereby the link or the like object held upon said hook cannot become disengaged therefrom.

With the above and other objects in view reference will be had to the drawings accompanying this application, wherein like numerals of reference designate corresponding parts throughout the several views, in which—

Figure 1:
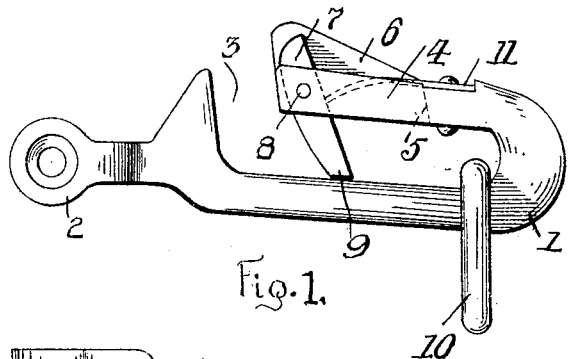
Figure 2:
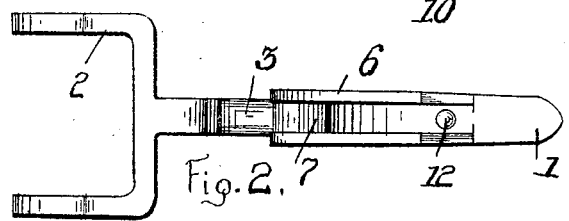
Figure 3:
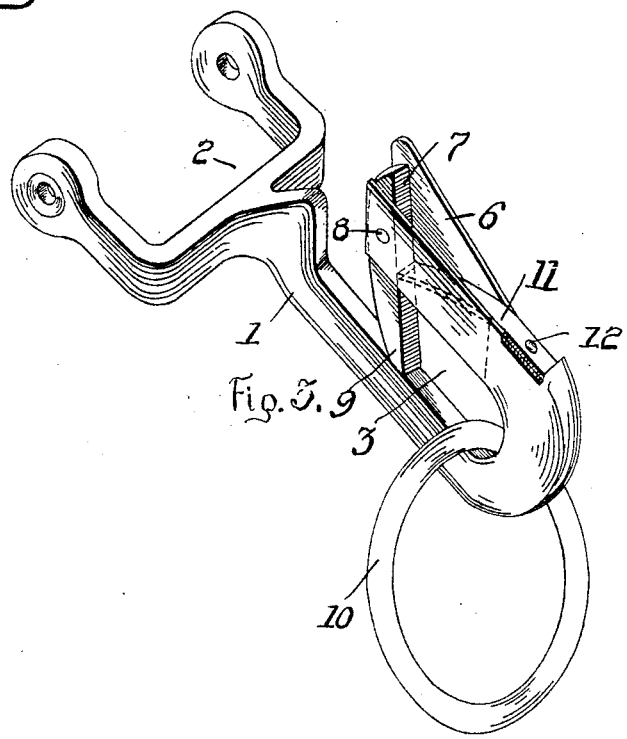

Figure 1 is a side elevation of my improved hook. Fig. 2 is a top plan view thereof, and Fig. 3 is a perspective view of a hook constructed in accordance with my invention.

To put my invention into practice, I construct my improved hook of a body portion 1, carrying upon its one end a yoke 2. The body portion of the hook has formed therein a substantially bayonet-shaped slot 3, the provision of this slot forming a substantially hooked-shaped body portion. The end of the hook, as designated by the reference-numeral 4, is slotted, as indicated at 5, and upon the one side of the slot is formed a lug or shield 6.

The reference-numeral 7 designates a pawl, which is pivotally mounted in the slot 5 by a pin 8, and this pawl is made of a sufficient size that the one end 9 of the pawl will rest upon the body portion of the hook and close the slot 3, while the other end thereof protrudes upwardly along the side of the lug or shield 6, whereby it may be easily depressed in case it is desired to open the slot 3. When the slot 3 is closed by the pawl, it lies at an angle to the body portion of the hook, whereby a link 10 or the like article which is secured in the hook will be prevented from forcing the pawl outwardly and releasing said link or article. To normally hold the pawl in the position illustrated in Fig. 1 of the drawings, I have provided a flat band-spring 11, which is secured on the upper face of the end of the hook 4, as indicated at 12, and the spring is adapted to bear against the pawl and normally hold it in engagement with the body portion of the hook and in a position which will close the slot 3.

It will be observed from the position of the pawl 7 that the link 10 can be readily placed in the open end of the slot and pulled upwardly past the pawl 7, the pawl receding within the slot until the link has passed into the loop end of the hook, at which time the pawl will return to its normal position and close the slot.

Heretofore in hooks of this type it has been possible to so position the article or link being held that with a sudden or spasmodic jerk the link or article could be removed from the hook, and for this reason I have constructed my improved hook as above described, whereby it will be impossible to remove the link or article without first depressing the spring-pressed pawl 7.

While I have herein shown the hook as carrying a yoke, which is the common practice in hooks of this type, I desire it to be understood that the yoke may be dispensed with and the ordinary eye formed on the end of the hook, whereby it can be carried by a suitable chain or cable.

It will be noted that various changes may be made in the details of construction without departing from the general spirit and scope of the invention.

What I claim, and desire to secure by Letters Patent, is—

A snap-hook having a hook member, the outer arm of which is slotted at its free end to form two side walls, one of which extends upwardly beyond the other and forms a shield, a pawl pivoted between said side walls having its upper end guarded by said shield and its lower end resting on the other arm of the hook member, a spring secured to the slotted arm of the hook member with its end bearing against the inner face of said pawl, substantially as described.

In testimony whereof I affix my signature in the presence of two witnesses.

THOMAS V. WALLACE.

Witnesses:
   JOSEPH SOULSBY,
   JOSEPH V. BIGELOW.